Patented Mar. 7, 1939

2,149,327

UNITED STATES PATENT OFFICE 2,149,327

METHOD OF PREPARING ANHYDROUS FERRIC SULPHATE

William S. Wilson, Brookline, and John F. White, Somerville, Mass., assignors, by mesne assignments to Monsanto Chemical Company, a corporation of Delaware No Drawing. Application May 16, 1934, Serial No. 725,901

8 Claims. (Cl. 23—126)

This invention relates to a novel anhydrous ferric sulphate product and a method for producing the same according to which a solution of ferric sulphate is converted to a homogeneous, coherent, uniform product which does not cake or set up readily, and consists of hard granules of substantially pure, neutral ferric sulphate, having little or no free acid, that dissolve substantially completely in water to give a clear solution.

Ferric sulphate has heretofore been proposed as a coagulant suitable for the purification of water and sewage, and as an astringent for use in the sizing of paper. Sulphates suitable for these purposes were conveniently prepared by various methods. For example, one method involved oxidation of ferrous sulphate to the ferric state by means of chlorine gas or nitric acid. However, another, and in many cases more economical method, involved the treatment of ferric oxides, such as iron ores or the oxide obtained in the roasting of pyrite, with sulphuric acid. The sulphates were obtained initially as aqueous solutions which were then evaporated to dryness, to form a product which could be handled and transported economically. A relatively large number of these ferric sulphate salts were known to exist and these were distinguished from one another by variation in the relative proportions of sulphate radical and iron oxide, the amount of water of crystallization present, and the relative solubility in water. The following constitute some of the sulphates which have been identified in the liquors or in the final product under various conditions of operation:

$Fe_2O_3 4SO_3 9H_2O$
$Fe_2O_3 4SO_3 3H_2O$
$Fe_2O_3 3SO_3$
$Fe_2O_3 3SO_3 . 6H_2O$
$Fe_2O_3 3SO_3 7H_2O$
$Fe_2O_3 2SO_3 H_2O$
$Fe_2O_3 2SO_3 5H_2O$
$2Fe_2O_3 5SO_3 17H_2O$

The salts containing the iron oxide and the sulphur trioxide in the ratio expressed by the formula $Fe_2O_3 3SO_3$ were termed "neutral" or "normal." The ones containing a higher ratio of $Fe_2O_3$ were termed basic and the ones of a lower ratio of the ferric oxide were termed "acidic."

The "normal" or neutral ferric sulphate ($Fe_2O_3 3SO_3$) constituted the preferred form of the sulphates; however, it was difficult or impracticable to obtain it in the anhydrous state without the conversion of a considerable percentage thereof into insoluble compositions which probably consisted of basic sulphates. Of course, where the material was used for purification of water or for purposes of sizing paper, the presence of these insoluble substances was highly undesirable.

The present invention involves a novel process whereby normal anhydrous ferric sulphates may be obtained from solutions without the formation of any appreciable amount of insoluble material.

In its broadest aspects the process may be applied to practically any solution of ferric sulphate which does not already contain substantial amounts of insoluble compounds; thus it may be applied to solutions of ferric sulphate obtained by the oxidation of ferrous sulphates into the ferric compounds. However, for reasons of economy it is preferred to employ a solution of ferric sulphate obtained by treating ferric oxide obtained, for example, by the roasting of pyrite in the manufacture of sulphuric acid. A convenient method of forming such solutions of ferric sulphates is disclosed in the copending application Serial No. 706,250, filed January 11, 1934, by John F. White and William S. Wilson. According to this process the ferric oxide or pyrite cinder in 20% or 25% excess of that theoretically required is treated with sulphuric acid of approximately 35°–40° Bé. If acid of lower concentration than this is employed, the time of reaction is increased to an unreasonable degree and if acid of materially higher concentration is employed acid salts may be precipitated. During the reaction there is considerable evaporation of water so that the ratio of total $SO_3$ to water tends to rise and care should be taken to prevent it from becoming higher than that represented by an acid of 40° Bé. taken at the boiling point during initial stages of the reaction else acid salts, just mentioned, will tend to crystallize out or precipitate. This precipitation, if unchecked, may proceed so far that the entire mass sets up into solid state. Such tendency may be corrected, if it occurs, by the addition of a suitable amount of water whenever acid salts begin to separate. After approximate 27% to 50% of the acid has combined with iron oxide, this tendency of the acid salts to precipitate ceases and it has now been found that only neutral salts can separate from concentrated solutions. It then becomes quite possible to concentrate the solution by boiling at normal or under reduced pressures without the formation of the undesirable components, and usually the solution is concentrated to approximately 59° or 60° Bé. before being subjected to subsequent treatment. Preferably a considerable excess of cinder, for example a 20% or 25% excess, is initially introduced for purposes of speeding up the reaction and effecting substantially complete removal of the sulpuric acid within a reasonable period. The excess, together with silicates or other insoluble material, is removed at completion of the reaction by decantation or filtration. Concentration of the solution may be conducted at normal boiling temperatures, provided conditions are so regulated as to prevent separation of crystals in the liquor and provided the temperature is not maintained for too long a period of time. Generally approximately six or seven hours is permissible without difficulty.

A solution of ferric sulphate prepared as thus described if subjected to complete drying and dehydration in the ordinary manner by direct heating to a temperature sufficiently high to remove all of the water present would be converted, at least to a considerable degree, into insoluble products (basic sulphates) which would be unsuitable for many commercial purposes. This undesirable effect, in accordance with the present invention, is obviated by so regulating the conditions existing within the solution during the stage of passing from solution form into the dry and solid but hydrated form of the sulphate, as to prevent the formation of a material amount of insolubles. The inhibition of the formation of insolubles during this critical stage in the process may be effected in various ways.

The method which is preferred at the present time involves the admixture of the relatively concentrated ferric sulphate liquors, such as those described above, with a sufficient amount of anhydrous ferric sulphate obtained, for example, by the method hereinafter disclosed, to obtain a dry material which contains a relatively large amount of hydrated ferric sulphate. It may be that the dry material comprises a mixture of salts of varying degrees of hydration but the average of these corresponds to approximately 24% or 25% water which is the amount present in the normal ferric sulphate of the formula $Fe_2O_3 3SO_3 7H_2O$. However, smaller or even slightly greater degrees of hydration may be permissible. The conditions under which this addition of the anhydrous or substantially anhydrous ferric sulphate to the liquor is effected should be carefully controlled during this stage of the process. For example, if the temperature rises to an undue degree or if the materials are subjected to only a moderately high temperature for too long a period of time, formation of insoluble compounds results. A temperature below 70° C. would be quite ideal because under these conditions practically no formation of insoluble compounds is possible. However, under actual conditions of operation it is desirable to maintain the feed liquors at fairly high temperatures, for example, 80°–90° C. in order to obviate the solidification of the liquor in the feed pipes. Also, the addition of the anhydrous material to the liquor results in the production of a considerable amount of heat of hydration which probably under actual working conditions results in a temperature of about 105°–110° C. Of course, this temperature might be lowered by suitably cooling the materials by some convenient means such as a blast of air or by jacketing the mixing apparatus and applying cooling fluid thereto. However, such cooling ordinarily is not necessary if the material contains sufficient free acid and does not remain too long in the mixing apparatus. It has been found that the material containing 9% (based upon total sulphate radical) of free $SO_3$ may be maintained at temperatures of the above range for a period of approximately 1 to 2 hours without the excessive formation of insolubles. With lower concentrations of free sulphuric acid either the temperature or the time of mixing should be reduced. For example, where only 4% of the total acid is present in free form, the temperature should be reduced to 80° C. or 85° C.

An essential feature of this stage of the process involves the substantially complete transformation of water of solution of the liquor into water of crystallization in the dry material. Of course, this transformation is readily promoted by making the admixture of anhydrous sulphate and sulphate liquor as intimate as practical. This intimacy is increased by thorough agitation and also by the employment of anhydrous sulphate in as fine a state of subdivision as practicable. It may also be mentioned that the finer the state of the anhydrous material fed into the liquid, the more uniform and regular will be the particles or pellets of the dry but hydrated ferric sulphate, and this constitutes a convenient method of controlling the particle size.

The admixture of the liquor with the anhydrous material may be effected upon practically any efficient type of mixing or stirring apparatus employed for mixing materials of this type. For example, one type of apparatus may comprise a screw conveyor of a sufficient length to thoroughly admix the liquor and the anhydrous material during its travel therethrough. It may be desirable to employ a relatively short screw conveyor and if this is done, thorough incorporation of the water of solution with the salt will not be effected during the time of travel through the conveyor. However, completion of this step may be effected by storing the material for a short period of time after it has passed through the conveyor. A hopper or some other suitable storage device may be employed for this purpose. It will be appreciated that the heat generated by the hydration of the anhydrous material by the water of solution during the step of admixture also tends to remove a considerable amount of water as vapor and this correspondingly reduces the amount of anhydrous sulphate required for complete removal of the water of solution present in the sulphate liquors. Accordingly, the amount of anhydrous sulphate required in the process will vary in accordance with the amount of water evaporated in this stage. However, if an excess of anhydrous material is present no harm will be done and in fact under some conditions the use of an excess may be desirable in order to accelerate the rate of absorption of water of solution and to reduce temperatures.

The dry material containing water of crystallization may be calcined safely in a suitable furnace at a temperature sufficient to form the anhydrous normal salt without insoluble formation. A rotary furnace capable of being heated to approximately 450° C. is suitable for this purpose. A period of about 10 or 20 minutes is sufficient to effect dehydration.

During this step, considerable of the free acid is evaporated. Also, there is usually present some ferrous sulphate (about 4%) and this reacts to a considerable degree, under the oxidizing conditions existing in the furnace, with the free sulphuric acid to form additional neutral sulphates. In this way the ferrous compounds are decreased as much as 60% to 75%.

The following constitute specific examples of conditions existing during the drying of sulphates in actual practice. They are to be considered merely as exemplary and not as restrictive:

Ferric sulphate is obtained conveniently by reacting ferric oxide with sulphuric acid. It is difficult, however, to obtain a ferric sulphate solution in which the reaction has gone to completion but we have found that a solution containing as much as 3.3% free $H_2SO_4$ may be employed without disadvantages in our process. An analysis of a typical ferric sulphate solution which is obtainable by reacting iron oxide with sulphuric acid is as follows:

| | |
|---|---|
| Total iron as $Fe_2O_3$ | 16.3 |
| Actual $Fe_2O_3$ | 15.35 |
| Iron as $FeO$ | .86 |
| $SO_3$ free | 2.75 |
| $SO_3$ total | 26.8 |

The source of the anhydrous ferric sulphate which we employ is not limitative of the principles of our invention, although it is convenient to pulverize off-size anhydrous ferric sulphate which is obtained in the process.

Although the mode of mixing the solution with the anhydrous ferric sulphate may be varied widely, we have obtained good results by causing a number of fine streams of the hot ferric sulphate solution to spray over a screw conveyor through which the anhydrous material is conducted. The rate at which the ferric sulphate solution is added should be such as to insure the lubricative effect which the solution imparts to the moving parts. The agitation should be vigorous and the temperature sufficiently high to prevent "freezing up" of the screw device and to avoid as far as possible agglomeration of the granules into lumps.

The screw conveyor is supplied continuously with anhydrous ferric sulphate at a regulated rate. The ferric sulphate should not contain a large amount of fines but should be ground whereby it passes through a 4 mesh screen but is retained on an eleven mesh screen. The material need not be carefully sized but may be the average run of a standard grinding mill, while avoiding insofar as possible excessive formation of "fines". The temperature of the powder supplied may advantageously be 100° C. or higher, although this is not essential. A ferric sulphate solution of 60° Bé. which is as hot as may be handled conveniently, as for example, 90° C., is sprayed uniformly over the anhydrous product as it is conveyed through the mixer. The combination of the aqueous solution with the anhydrous ferric sulphate results in the development of considerable heat which in turn results in the volatilization of some of the water which is present. The hydrate forms in granules and cools, due in part to the evaporation of the water as it passes through the conveyor. The granules are extremely hard, although during their formation and before the solid hydrate forms completely they tend to adhere to the parts of the mixer and may freeze up in the mixer unless the agitation is rapid and the relative amounts of anhydrous ferric sulphate and ferric sulphate solution are supplied at uniform rates. When employing a screw conveyor for effecting the mixing, we have found that by supplying the aqueous solution at such rate as to take advantage of the lubricative value of the solution on the moving parts that the difficulties due to freezing may largely be overcome, particularly if the mixing is fairly complete before the temperature of the product has an opportunity to drop substantially. The solution and the anhydrous ferric sulphate are mixed preferably at one end of the conveyor, say over one-third of the length thereof, the remainder of the conveyor serving to complete the mixing and granulation to afford the resulting mixture sufficient time to crystallize into the hydrate. The hydrate crystal formation is facilitated by reducing the temperature which in turn results from the volatilization of water during the travel through the conveyor. The resulting product consists of extremely hard granules of hydrated ferric sulphate which may be dried easily and conveniently by any of the usual drying devices, such, for example, as a rotating kiln.

Another method of effecting the granulation, which is preferred insofar as ease of operation and control are concerned, consists in feeding anhydrous ferric sulphate and ferric sulphate solution continuously to a rotating drum type mixer such as is commonly employed in the mixing of concrete and the like.

According to this method pulverulent anhydrous ferric sulphate is supplied continuously into an inclined rotating drum type mixer which is positioned to discharge continously. The hot ferric sulphate solution is likewise fed into the mixer continuously and at a regulated rate with respect to the rate at which the anhydrous product is supplied. As in the previous example, the ferric sulphate solution should be as concentrated as possible to gain the greatest output and to minimize the amount of anhydrous product which is required. By employing this type of mixer one may utilize an anhydrous ferric sulphate which is more finely ground than that employed in the procedure described in the preceding example.

As in the preceding example, considerable heat is developed during the mixing of the solid product with the solution which is dissipated as latent heat of evaporation of a portion of the water. Uniform distribution of the solution in the charge being mixed is desirable. To this end the solution may be introduced at more than one point. Although the material undergoing mixing is present as a single body, the individual particles follow a fairly definite course of travel. It is advantageous to supply the solution just ahead of the point at which the anhydrous product is supplied. In other words, the solution contacts the charge at a point which is already supplied with the anhydrous sulphate.

In a mixer having a capacity of 1700 pounds of product and which rotates at 18 R. P. M. one is able to produce 415 pounds (anhydrous basis) of relatively uniform granular product per hour by feeding 1100 pounds anhydrous ferric sulphate and 850 pounds of ferric sulphate solution of 58° Bé. (this being equivalent to 49% of anhydrous ferric sulphate and 46% of water).

Although the average granule size may be varied by changing the rates at which the pulverulent ferric sulphate and solution are supplied to the mixer, the foregoing rates have been found to produce a product which is hard, dense and one which resists decrepitation or abrasion when subjected to dehydration. The average granule size is uniform and the product flows or pours easily. Notwithstanding the uniformity of the product one does obtain, from time to time, rounded agglomerates which may vary in diameter from one inch to four or five inches. The formation of these agglomerates is usually attributable to irregularity of operation, such as localization of the supply of ferric sulphate liquor. These materials may, however, be returned to the pulverizer preferably after passing through the kiln.

Where the product is formed by the methods of mixing set forth in either of the preceding examples, dehydration may be performed by standard methods. One such method which we have found convenient consists in causing the material to flow through a rotary kiln in contact with combustion gases under conditions whereby the product is discharged at a temperature sufficiently high to assure volatilization of any free sulphuric acid as well as water which may be present. To this end a kiln discharge temperature of the product of approximately 450° C. will be found sufficient. Obviously, other methods of effecting the removal of water and free acid may be employed. The kiln method, however, is practicable in view of the hard, dense nature of the hydrous product which is formed by our method.

The dehydrated product will be found to be of substantially the same configuration as the hydrated raw material from which it is formed, differing only in the moisture and free acid content. By proceeding as described and discharging the product at a temperature of 450° C. we are able to convert a hydrous product having substantially the following composition:

| | Per cent |
|---|---|
| $Fe_2(SO_4)_3$ | 80 |
| $FeSO_4$ | 3 |
| $H_2SO_4$ | 4 | to an anhydrous product having substantially the following composition:

| | Per cent |
|---|---|
| $Fe_2(SO_4)_3$ | 94 |
| $FeSO_4$ | 2 |
| $H_2SO_4$ | 2 |

From the foregoing description it will be evident that we have provided a novel method of producing anhydrous ferric sulphate from a ferric sulphate solution which is characterized in that the first step of the dehydration is effected by a dehydration of a solution and rehydration of anhydrous ferric sulphate to produce a dense, hard, solid granule of ferric sulphate containing water of crystallization, after which the product is dehydrated to produce a hard, anhydrous, granular ferric sulphate characterized by its uniformity, homogeneity and density. It is quite possible that the presence of the free acid has a beneficial effect in that it impedes the decomposition of the ferric sulphate while at the same time it enables one to eliminate the water. It is easy to dehydrate the product under conditions which assure the elimination by volatilization of this free acid.

The final product, as thus prepared, is characterized by its being in the form of hard, dense pellets that preferably will pass through a four mesh screen but are retained by an eleven mesh screen. It is practically anhydrous, contains not more than three or four per cent of free acid, is at least 99% soluble in warm water, and apparently consists essentially of normal ferric sulphate ($Fe_2O_3 3SO_3$).

As previously stated, one feature of the invention involves the conversion of ferric sulphate liquors into a dry material containing substantially no free water of solution. This may be effected in a plurality of ways by controlling the conditions under which the water of solution is removed. One convenient method that gives the same apparent result consists in subjecting the liquor, already described, to extremely rapid drying, for example, upon a conventional spray drying apparatus where the conversion into a dry material is effected almost instantaneously. This dry material is apparently non-crystalline, but this is not known definitely. In appearance the material suggests glassy, shellac-like particles. These particles may be either a crystalline compound, or a solid solution of the sulphate in water, or some other state of aggregation. When dehydrated the final results obtained are the same as when dehydrating the crystalline material.

Another method of effecting the same results involves drying the material as a film upon a drum dryer of conventional type. It will be appreciated that both of these latter two methods of drying are fairly closely related to the method already described, in which anhydrous material is added to a liquor, because in each case the conversion of the liquor into a dry material is effected so quickly that the formation of insolubles is substantially inhibited.

In these processes the liquor may be carried to the dry state but still containing 25% of water and this product then dehydrated in an additional stage as already described, or both stages may be conducted simultaneously. In the latter case the complete removal of the water of solution should be effected within a short period of time, for example, five or six minutes.

As already intimated, it is also found that the formation of insoluble substances in the product during the stage of conversion from liquor to solid may be retarded or prevented by regulating the concentration of the free acid present during the critical stage of converting the liquor into a dry compound. It has been found by actual experience that if this acidity is maintained at approximately 9% to 10%, based upon total acid, while the conversion of liquid to solid state is taking place, that practically all of the final dehydrated product will be obtained in a soluble condition, irrespective, within reasonable limits, of time and temperature of drying and dehydrating. However, where small amounts of acid (e. g. 3.3% or 4%) are employed care must be observed to prevent the temperature from rising above about 85° C. for any extensive period of time.

It is to be understood that only illustrative examples of embodiments of the invention have been given and that various modifications may be made therein without departure from the spirit of the invention or from the scope of the appended claims.

What we claim is:

1. A method of manufacturing water soluble, anhydrous, normal ferric sulphate which comprises forming a solution of ferric sulphate salts containing substantially no insoluble materials and converting this solution into a dry compound containing water of crystallization sufficiently quickly and at a temperature above approximately 70° C. but sufficiently low to prevent the formation of basic ferric sulphates and subsequently driving off the water of crystallization.

2. A method of manufacturing water soluble anhydrous ferric sulphate which comprises forming a solution of ferric sulphate salts by treating ferric oxide with sulphuric acid while maintaining the concentration of the acid at a value not substantially above 40° Bé., and subsequently transforming these salts into a dry form containing water of crystallization sufficiently quickly and at a temperature above 70° C. but sufficiently low to prevent the formation of insoluble basic ferric sulphate compounds, and finally removing the water of hydration by calcination at a relatively high temperature.

3. A method of manufacturing substantially completely water soluble anhydrous ferric sulphate which comprises treating ferric sulphate solution with anhydrous ferric sulphate in an amount sufficient to remove substantially all of the water of solution and then driving off the water of crystallization.

4. A method of manufacturing substantially completely water soluble ferric sulphate in the anhydrous state which comprises treating ferric oxide with sulphuric acid while maintaining the concentration of the acid at about 40° Bé., and subsequently removing the water of solution by the addition of anhydrous ferric sulphate, and then driving off the water of hydration.

5. A method of forming substantially completely soluble anhydrous ferric sulphate which comprises forming a solution of soluble ferric sulphate salts, then removing the water of solution sufficiently quickly and at a temperature above approximately 70° C. and sufficiently low to prevent the formation of insoluble basic compounds, and finally driving off the remaining water.

6. A method of forming substantially completely water soluble anhydrous normal ferric sulphate which comprises forming a solution of soluble ferric sulphate salts, then removing the water of solution by spray drying sufficiently quickly and at a temperature above approximately 70° C. but sufficiently low to prevent the formation of insoluble basic compounds whereby a dry solid hydrated product is obtained and finally expelling the water by application of heat and without causing said hydrated product to revert to liquid phase.

7. A method of forming substantially completely water soluble anhydrous normal ferric sulphate which comprises forming a solution of soluble ferric sulphate salts, then removing the water of solution by first forming the material into a dry solid flake sufficiently quickly and at a temperature above approximately 70° C. but sufficiently low to prevent the formation of insoluble basic compounds, and subsequently driving off the water of crystallization, while avoiding the formation of a liquid phase.

8. A method of preparing normal anhydrous, substantially completely water soluble ferric sulphate which comprises reacting sulphuric acid of approximately 35° to 40° Bé. with ferric oxide to form neutral sulphates in solution, then removing the water of solution sufficiently quickly and at a temperature above 70° C. but sufficiently low to inhibit the precipitation of basic sulphates, and finally driving off water of hydration.

WILLIAM S. WILSON.
JOHN F. WHITE.